United States Patent
Ohwada et al.

(10) Patent No.: US 6,692,134 B2
(45) Date of Patent: Feb. 17, 2004

(54) SURFACE-EMITTING DEVICE PRECISELY POSITIONED IN THE FRONT OF LIQUID CRYSTAL DISPLAY UNIT, AND LIQUID CRYSTAL DISPLAY DEVICE HAVING THE SURFACE-EMITTING DEVICE

(75) Inventors: Kou Ohwada, Fukushima-ken (JP); Hideaki Nagakubo, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/188,709

(22) Filed: Jul. 2, 2002

(65) Prior Publication Data

US 2003/0007343 A1 Jan. 9, 2003

(30) Foreign Application Priority Data

Jul. 6, 2001 (JP) ........................................ 2001-206287

(51) Int. Cl.[7] .............................................. G01D 11/28
(52) U.S. Cl. ........................................... 362/31; 362/26
(58) Field of Search ............................ 362/26, 31, 27, 362/362; 349/58, 60, 62, 63, 65

(56) References Cited

U.S. PATENT DOCUMENTS

| 5,497,293 | A | * | 3/1996 | Noguchi et al. | ............... 362/26 |
| 6,104,453 | A | | 8/2000 | Watanabe | |
| 6,309,081 | B1 | * | 10/2001 | Furihata | ....................... 362/31 |
| 6,454,423 | B1 | * | 9/2002 | Suzuki et al. | .................. 362/31 |
| 6,522,371 | B1 | * | 2/2003 | Sakamoto et al. | ............ 349/58 |
| 2002/0093603 | A1 | * | 7/2002 | Chen | ........................... 349/65 |

* cited by examiner

*Primary Examiner*—Y. My Quach-Lee
(74) *Attorney, Agent, or Firm*—Brinks Hofer Gilson & Lione

(57) ABSTRACT

A front light includes a bar-shaped light source, and a light guide panel that introduces light from the light source through an end face and emits the light from an emergent surface. The light source is supported at an end of the light guide panel by a cover member disposed so as to cover the light source and a part of the light guide panel. Protuberances are formed on the inner surface of the cover member, and the light guide panel is grasped via the protuberances. The light guide panel is positioned in the widthwise direction by projecting pieces extending from both sides of the cover member.

22 Claims, 4 Drawing Sheets

SURFACE-EMITTING DEVICE PRECISELY POSITIONED IN THE FRONT OF LIQUID CRYSTAL DISPLAY UNIT, AND LIQUID CRYSTAL DISPLAY DEVICE HAVING THE SURFACE-EMITTING DEVICE

BACKGROUND OF THE INVENTION

1. Field of the Invention

The present invention relates to a surface-emitting device and a liquid crystal display device.

2. Description of the Related Art

Hitherto, in reflective liquid crystal display devices that produce display with ambient light used as a light source, the visibility of the display extremely decreases in an environment in which ambient light is insufficient, for example, when used in a dark place, because the brightness depends on the amount of ambient light. Accordingly, a liquid crystal display device has been proposed in which a front light (surface-emitting device) serving as an auxiliary light source is placed in the front of a reflective liquid crystal display unit (liquid crystal display element). The liquid crystal display device having the front light operates as a normal reflective liquid crystal display device in an environment in which ambient light is sufficient, for example, outdoors in the daytime, and illuminates the front light as the light source, as necessary. FIG. 6 shows an example of such a liquid crystal display device in which a front light is placed in the front of a liquid crystal display element. A liquid crystal display device 100 shown in FIG. 6 includes a liquid crystal display unit 120, and a front light 110. The front light 110 is placed in the front of (on the upper surface in FIG. 6) of the liquid crystal display unit 120 so that a light guide panel 112 is disposed in a display region of the liquid crystal display unit 120.

The front light 110 includes a flat light guide panel 112 formed by injection-molding a transparent acrylic resin or the like, and a bar light source 113 disposed at an end of the light guide panel 112. A light-source cover 115 having an angular-U profile and made of a metal plate is mounted from the side of the bar light source 113. That is, the light-source cover 115 stores the bar light source 113 therein, and grasps the ends of the upper and lower surfaces of the light guide panel 112 on the side of the bar light source 113 by the inner surface at its open leading end, thereby supporting the light guide panel 112 and the bar light source 113 at predetermined positions. A reflecting film (not shown) made of a silver thin film or the like is formed on the inner surface of the light-source cover 115 so as to return light, which is emitted toward the inner surface of the light-source cover 115 without entering the light guide panel 112, to a light guide member 113a for utilization. The lower surface of the light guide panel 112 (on the side of the liquid crystal display unit 120) serves as an emergent surface from which light emerges, and a surface opposite from the emergent surface (upper surface of the light guide panel 112) serves as a prism surface 112c on which wedge-shaped grooves 114 are alternately and periodically arranged so as to change the direction of light propagating inside the light guide panel 112.

The bar light source 113 includes a bar-shaped light guide member 113a, and LEDs (Light Emitting Diodes) 113b disposed at both ends thereof so as to serve as light emitting elements. Light emitted from the LEDs 113b is guided to an end face 112a of the light guide panel 112 by the light guide member 113a, and enters the light guide panel 112 through the end face 112a.

The liquid crystal display unit 120 is of a reflective type, and produces display by reflecting light incident from the front light 110 by a built-in or externally mounted reflecting plate. The liquid crystal display device 100 having the above configuration produces normal reflective display by reflecting external light in an environment in which external light is sufficient, and produces display by reflecting light from the front light 110 serving as the light source in a dark place in which external light is not obtained.

In the liquid crystal display device 100 having the above configuration, however, a phenomenon in which the brightness of the front light 110 partially decreased sometimes occurred in acceleration tests in which heating and cooling were periodically repeated. The present inventors and the like made examinations on this problem, and found that the decrease of the brightness was caused by the displacement of the light guide panel 112 and the light guide member 113a.

FIG. 7 is a plan view showing the optical path of the front light 110 shown in FIG. 6. As shown in FIG. 7, a surface of the light guide member 113a of the bar light source 113 opposite from the light guide panel 112 serves as a prism surface 118, and light incident from the LEDs 113b on the light guide member 113a is reflected by the prism surface 118, and is emitted toward the light guide panel 112. Since the propagating direction of the light reflected by the prism surface 118 is limited to a narrow range in the front light 110 having such a structure, the position of the light guide panel 112 relative to the light guide member 113a of the bar light source 113 must be exactly adjusted, in particular, in the widthwise direction of the light guide panel 112, in order to uniformly direct the light into the light guide panel 112. For example, as shown in FIG. 7, when the light guide panel 112 is displaced to the right in the figure, the amount of light at a right edge 116 of the light guide panel 112 partially decreases, and the amount of emergent light is prone to be nonuniform in the plane. This partially decreases the visibility of the liquid crystal display device 100.

Since the bar light source 113 and the light guide panel 112 are fixed by mounting the light-source cover 115 having an angular-U profile to the end of the bar light source 113 in the liquid crystal display device 100, as described above, the light guide panel 112 is grasped by the inner side of the light-source cover 115. Since the light guide panel 112 is clamped by a wide inner surface of the light-source cover 115 in such a structure, the wide inner surface of the light-source cover 115 receives expansion and contraction of the reflecting film formed on the inner surface of the light-source cover 115, and the light guide panel 112 is prone to displacement.

SUMMARY OF THE INVENTION

Accordingly, an object of the present invention is to provide a reliable surface-emitting device in which a bar light source and a light guide panel can be placed and maintained in precise positions.

Another object of the present invention is to provide a reliable liquid crystal display device in which a surface-emitting device and a liquid crystal display element can be maintained in precise positions.

In order to achieve the above objects, according to an aspect, the present invention provides a surface-emitting device including a bar-shaped light source, and a light guide panel in which light from the light source is introduced from an end face and is emitted from an emergent surface, wherein the light source is supported at an end of the light guide panel by a cover member disposed so as to cover the light source and the end of the light guide panel, projecting pieces are formed at both ends of the cover member so as to clamp the end of the light guide panel from both sides in the widthwise direction, and the light guide panel is positioned in the widthwise direction by the projecting pieces.

In such a configuration, since the light guide panel can be precisely positioned in the widthwise direction by the projecting pieces formed at both ends of the cover member, the light guide panel and the light source are rarely displaced, and the reliability of the surface-emitting device can be increased.

Preferably, projecting pieces contain first portions that project in the widthwise direction of the light guide panel and second portions that extend from the first portions along the lengthwise direction of the light guide panel, and the distance between the projecting pieces is substantially equal to the width of the light guide panel. In such a structure, the movement of the light guide panel in the widthwise direction is limited by the projecting pieces disposed on both sides thereof, and the light source and the light guide panel can be fixed so that they are less prone to displacement.

According to another aspect, the present invention provides a surface-emitting device including a bar-shaped light source, and a light guide panel in which light from the light source is introduced from an end face and is emitted from an emergent surface, wherein the light source is supported at an end of the light guide panel by a cover member disposed so as to cover the light source and the end of the light guide panel, protuberances are formed on the inner surface of the cover member so as to be in contact with the end of the light guide panel, and the cover member clamps the end of the light guide panel via the protuberances.

Since the cover member for fixing the light guide panel grasps the light guide panel via the protuberances formed on the inner surface thereof, the contact area between the light guide panel and the cover member can be made smaller than in the conventional configuration in which the cover member fixes the light guide panel by the inner surface or edge thereof, and therefore, the changes in size of the light-source cover and the light guide panel due to expansion and contraction rarely affect each other. Consequently, the light guide panel and the light source will not be displaced by heating and cooling, and the reliability of the surface-emitting device can be increased.

According to a further aspect, the present invention provides a surface-emitting device including a bar-shaped light source, and a light guide panel in which light from the light source is introduced from an end face and is emitted from an emergent surface, wherein the light source is supported at an end of the light guide panel by a cover member disposed so as to cover the light source and a part of the light guide panel, protuberances are formed on the inner surface of the cover member so as to be in contact with the end of the light guide panel, the cover member clamps and supports the end of the light guide panel via the protuberances, projecting pieces for clamping the end of the light guide panel from both sides in the widthwise direction are formed at both ends of the cover member, and the light guide panel is positioned in the widthwise direction by the projecting pieces.

That is, this surface-emitting device has the structure for supporting the light guide panel by the protuberances and the structure for positioning the light guide panel by the projecting pieces extending at both ends of the light source. Therefore, this configuration makes it possible to achieve a more reliable surface-emitting device in which the light guide panel and the light source are not displaced by expansion and contraction of the light guide panel and the light-source cover due to heating and cooling.

The projecting pieces may serve as fitting portions for fixing the surface-emitting device to a housing. This allows the surface-emitting device to be easily and precisely fixed to an electronic device, and enhances the working efficiency during production. Moreover, since the light source and the light guide panel can be precisely positioned by the projecting pieces, and are rarely displaced, as described above, for example, the light guide panel and a display element placed on the rear side thereof can also be precisely positioned by reliably fixing the cover member to the housing by the fitting portions.

The projecting pieces may respectively have base portions extending from both ends of the cover member in the thickness direction of the light guide panel, fitting plates extending from the leading ends of the base portions in the lengthwise direction of the light guide panel, retaining portions projecting from the outer edges of the fitting plates and bent upward at connecting portions to the fitting plates, and retaining projections bent upward at the leading ends of the fitting plates.

That is, the surface-emitting device can be easily fixed to the housing by forming the retaining portions for fixing on the outer sides of the fitting plates extending in the lengthwise direction of the light guide panel. By forming the retaining projections at the leading ends of the fitting plates, the movement of the surface-emitting device in the lengthwise direction of the light guide panel can be limited, the surface-emitting device can be precisely positioned, and the position thereof is rarely displaced.

Preferably, a reflecting film for reflecting light from the light source is formed on the rear side of the light-source cover. In this case, light incident on the inner surface of the light-source cover can be reflected to reduce the light loss by the light-source cover, and to enhance the utilization efficiency of the light source.

According to a further aspect, the present invention provides a liquid crystal display device including any of the above-described surface-emitting devices that is disposed in the front of a liquid crystal display element. That is, the adoption of the above highly reliable surface-emitting device can achieve a liquid crystal display device in which the brightness is rarely decreased by heating and cooling, and high visibility is ensured for a long period.

According to a still further aspect, the present invention provides a liquid crystal display device including a surface-emitting device in which projecting pieces are formed as fitting portions in the above-described cover member, a liquid crystal display element placed on an emergent side of the surface-emitting device, and a housing for supporting the surface-emitting device and the liquid crystal display element, wherein hook-shaped retaining members formed in the housing are engaged with the projecting pieces of the cover member in the surface-emitting device so that the surface-emitting device, the liquid crystal display element, and the housing are fixedly combined. This allows the surface-emitting device to be easily and precisely fixed to the housing via the fitting portions.

Preferably, the length of fitting plates of the projecting pieces and the width of the retaining members are substantially equal to each other. In this case, it is more difficult for the position of the surface-emitting device to be displaced from the housing. This is because the movement of the surface-emitting device in the lengthwise direction of the light guide panel relative to the retaining members of the housing is limited by retaining projections formed in the fitting portions. The movements of the surface-emitting device in the widthwise direction and the thickness direction of the light guide panel are limited by engaging the retaining members with retaining portions formed on the outer sides of the fitting portions. Consequently, it is possible to minimize the displacement of the surface-emitting device from the housing, and to increase the reliability of the liquid crystal display device.

Further objects, features, and advantages of the present invention will become apparent from the following description of the preferred embodiments with reference to the attached drawings.

DESCRIPTION OF THE PREFERRED EMBODIMENTS

While embodiments of the present invention will be described below with reference to the drawings, the present invention is not limited to the following embodiments.
(Surface-emitting Device)

Figure 1:
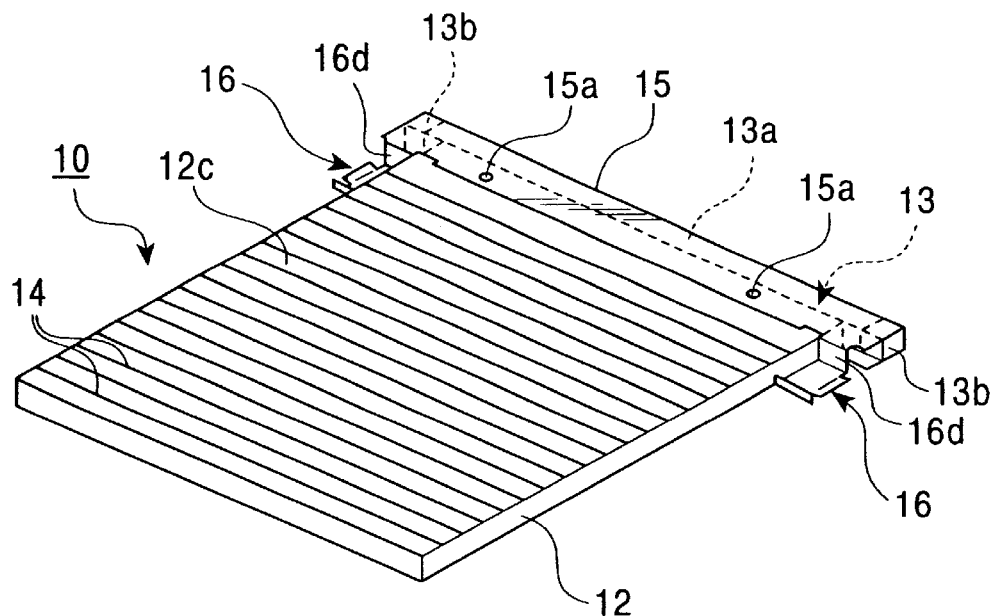
FIG. 1 is a perspective view of a front light according to an embodiment of the present invention.
Figure 2:
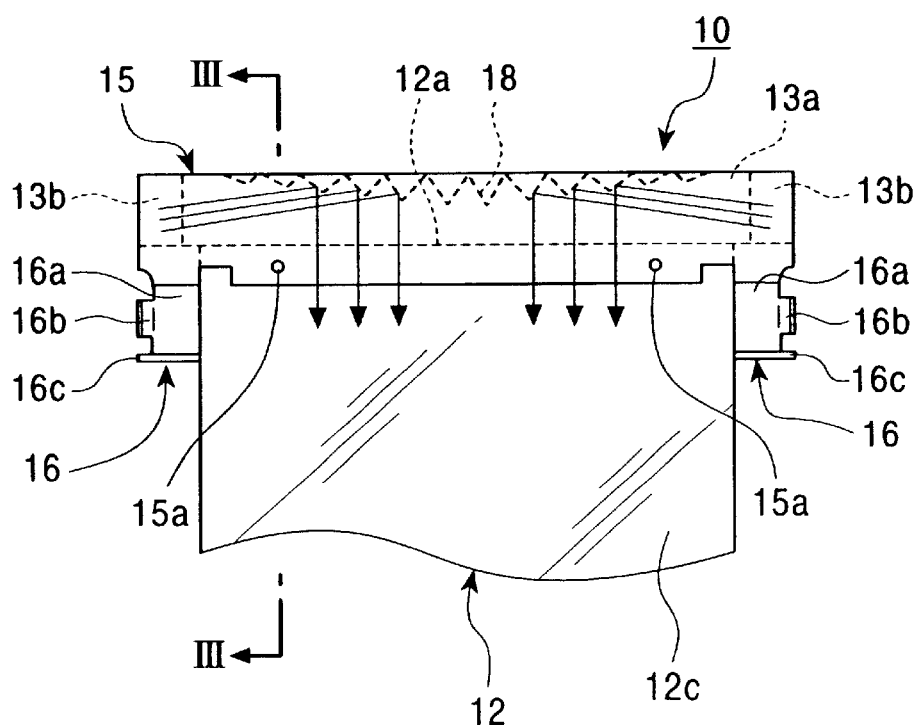
FIG. 2 is a partial plan view of the front light shown in FIG. 1.

FIGS. 1 and 2 are a perspective view and a partial plan view, respectively, of a surface-emitting device according to an embodiment of the present invention. Referring to these figures, a front light (surface-emitting device) 10 includes a flat light guide panel 12 made of a transparent resin material, and a bar light source (light source) 13 placed at an end on the side of an end face 12a of the light guide panel 12 (at one end on the short side of the rectangular light guide panel 12). A light-source cover (cover member) 15 of angular-U transverse section is mounted from the side of the bar light source 13 so as to clamp the upper and lower surfaces of the light guide panel 12 at the leading end thereof, thereby fixing the light guide panel 12 and the bar light source 13.

The light guide panel 12 is a transparent flat member, and has a structure in which the end face 12a facing the light source 13 serves as an incident surface, and light introduced from the end face 12a is reflected by a reflecting surface 12c having wedge-shaped grooves 14 intermittently formed in stripes almost in parallel with the end face 12a, and emerges from a surface (a lower surface in the figure) opposite from the reflecting surface 12c. The light guide panel 12 can be produced, for example, by injection-molding a flat plate from a transparent resin material such as acrylic resin. Besides acrylic resin, the light guide plate 12 may be made of transparent resin materials, such as polycarbonate resin and epoxy resin, glass, and the like. More specifically, for example, ARTON (from JSR Corporation) and ZEONOR (from Zeon Corporation) are preferable, although the material is not limited to them.

As shown in FIG. 2, the light source 13 includes a bar-shaped light guide member 13a made of acrylic resin or polycarbonate resin and shaped like a quadrangular prism, and light-emitting elements 13b placed at both ends in the longitudinal direction of the light guide member 13a and formed of an LED (white LED). A side face of the light guide member 13a opposite from the light guide panel 12 is a prism surface 18 having a prismatic shape. By reflecting light introduced from the light emitting elements 13b into the liquid guide member 13a by this surface, the propagating direction of the light is changed toward the light guide panel 12, and consequently, the light emitted from the light emitting elements 13b is applied on the end face 12a of the light guide panel 12.

While the light source 13 of this embodiment has the light emitting elements 13b formed of an LED, the light emitting elements may adopt a cold cathode-ray tube, an organic EL element, or the like. Any type may be suitably used as long as it can uniformly apply light onto the end face 12a of the light guide panel 12.

The light-source cover 15 is mounted from the side of the light source 13 so as to support and fix the light source 13 and the light guide panel 12. The light-source cover 15 can be produced by, for example, machining a metal plate of stainless steel. While the light-source cover 15 has an angular-U profile in this embodiment, the side shape thereof may be appropriately determined in accordance with the shape of the light source 13. When the light source 13 is cylindrical, the light-source cover 15 may be shaped in accordance with the side shape of the light source 13. Alternatively, side plates may be placed at both ends of the light-source cover 15 so as to cover the outer sides of the light emitting elements 13b.

Figure 3:
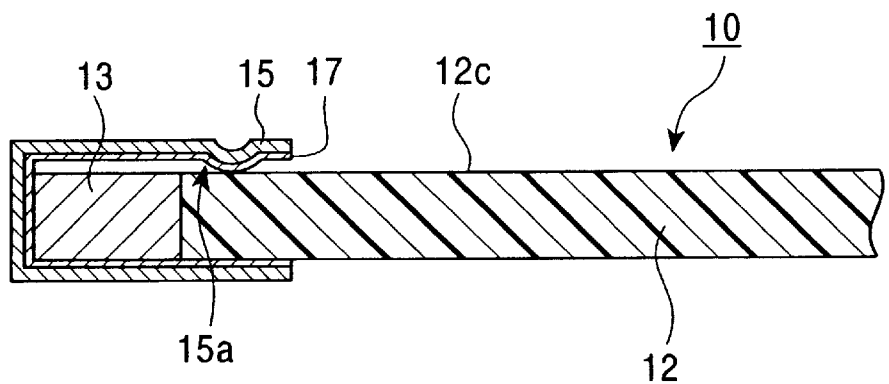
FIG. 3 is a partial sectional view of the front light shown in FIG. 2.

FIG. 3 is a partial sectional view of the front light 10, taken along line III—III in FIG. 2. As shown in FIGS. 2 and 3, two protuberances 15a for fixedly pressing the upper surface (reflecting surface 12c) of the light guide panel 12 are formed on the upper inner surface of the light-source cover 15, and a reflecting film 17 is made of a high-reflectance thin metal film of silver, aluminum, or the like on the inner surface of the light-source cover 15. The front light 10 of this embodiment has a structure in which the light-source cover 15 mounted from the side of the light source 13 is point-supported by the protuberances 15a on the upper side of the light guide panel 12, and is supported by the lower inner surface of the light-source cover 15 on the lower side of the light guide panel 12. Because of this structure, stress caused by expansion and contraction of the reflecting film 17 and the light-source cover 15 is rarely applied on a wide surface of the light guide panel 12, and the light guide panel 12 and the light source 13 are rarely displaced in the front light 10. The reflecting film 17 is formed on the inner surface of the light-source cover 15, as shown in FIG. 3. By reflecting light directed toward the inner surface of the light-source cover 15 by the reflecting film 17, the light utilization efficiency is enhanced.

While the two protuberances 15a are formed on the upper inner surface of the light-source cover 15 in this embodiment, the size, number, and the like of the protuberances 15a may be appropriately changed. For example, protuberances may be formed not only on the upper side of the light-source cover 15, but also on the lower inner surface thereof so that the light guide panel 12 is clamped by only the protuberances. Alternatively, one or more than three protuberances may be formed on the upper side of the light-source cover 15. Since variations in pressing force among the protuberances sometimes cause the light guide panel 12 to be displaced, it is preferable that protuberances be arranged in symmetry with respect to the center in the widthwise direction of the light guide panel 12.

As shown in FIG. 1, projecting pieces 16 extend in the thickness direction of the light guide panel 12 on both upper sides of the light-source cover 15. The projecting pieces 16 respectively include base portions 16*d* extending from both upper ends of the light-source cover 15 in the thickness direction of the light guide panel 12, and fitting plates 16*a* extending from the leading ends of the base portions 16*d* in the lengthwise direction of the light guide panel 12. The distance between the two projecting pieces 16 is substantially equal to the width of the light guide panel 12. In other words, in the front light 10 of this embodiment, the light guide panel 12 is inserted between the projecting pieces 16 of the light-source cover 15, and is fixedly positioned in the widthwise direction. Therefore, even if stress for moving the light guide panel 12 in the widthwise direction acts on the light guide panel 12, the movement in the widthwise direction of the light guide panel 12 is limited by the projecting pieces 16, and therefore, the light guide panel 12 is rarely displaced.

It is preferable that the distance between the projecting pieces 16 and the light guide panel 12 be 0.1 mm or less. When the distance exceeds 0.1 mm, the offset amount between the light guide member 13*a* of the light source 13 and the light guide panel 12 exceeds 0.1 mm, the brightness on the emergent surface of the light guide panel 12 partially decreases, and the uniformity of the brightness decreases.

As shown in FIGS. 1 and 2, the projecting pieces 16 each include the base portion 16*d* extending in the thickness direction of the light guide panel 12, the fitting plate 16*a* extending from the base portion 16*d* in parallel with the reflecting surface 12*c* of the light guide panel 12, a retaining portion 16*b* projecting outward from the fitting plate 16*a* and slightly bent upward (perpendicularly to the fitting plate 16*a*) at its base end, and a retaining projection 16*c* extending from the leading end of the fitting plate 16*a* and bent upward (perpendicularly to the fitting plate 16*a*) at its base end. The projecting pieces 16 are formed so as to fix the front light 10 in the front of a display device or to an electronic device. The above structure makes it possible to easily position and mount the front light 10 when fixed, and to prevent the front light 10 from being displaced. In order to explain the structure and operation of the front light 10, a liquid crystal display device in which the front light 10 of this embodiment is placed in the front of a liquid crystal display unit (liquid crystal display element) will be described below as an example of an electronic device having the front light 10 mounted therein.

Figure 4:
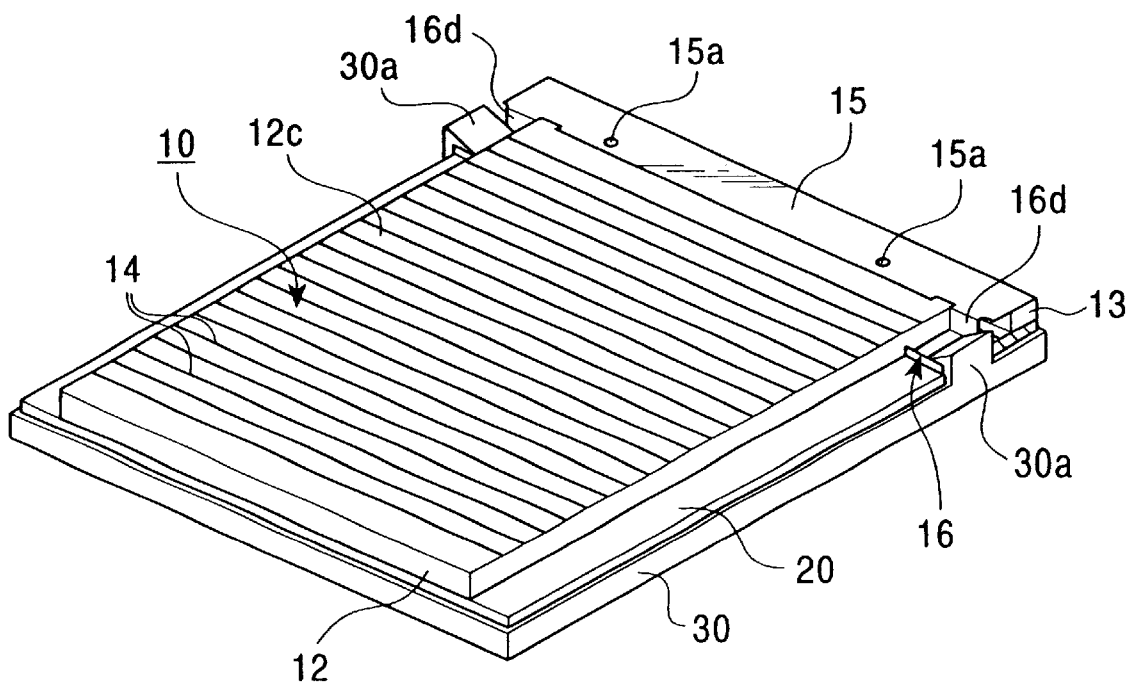
FIG. 4 is a view showing an example of a liquid crystal display device having the front light of the present invention.
Figure 5:
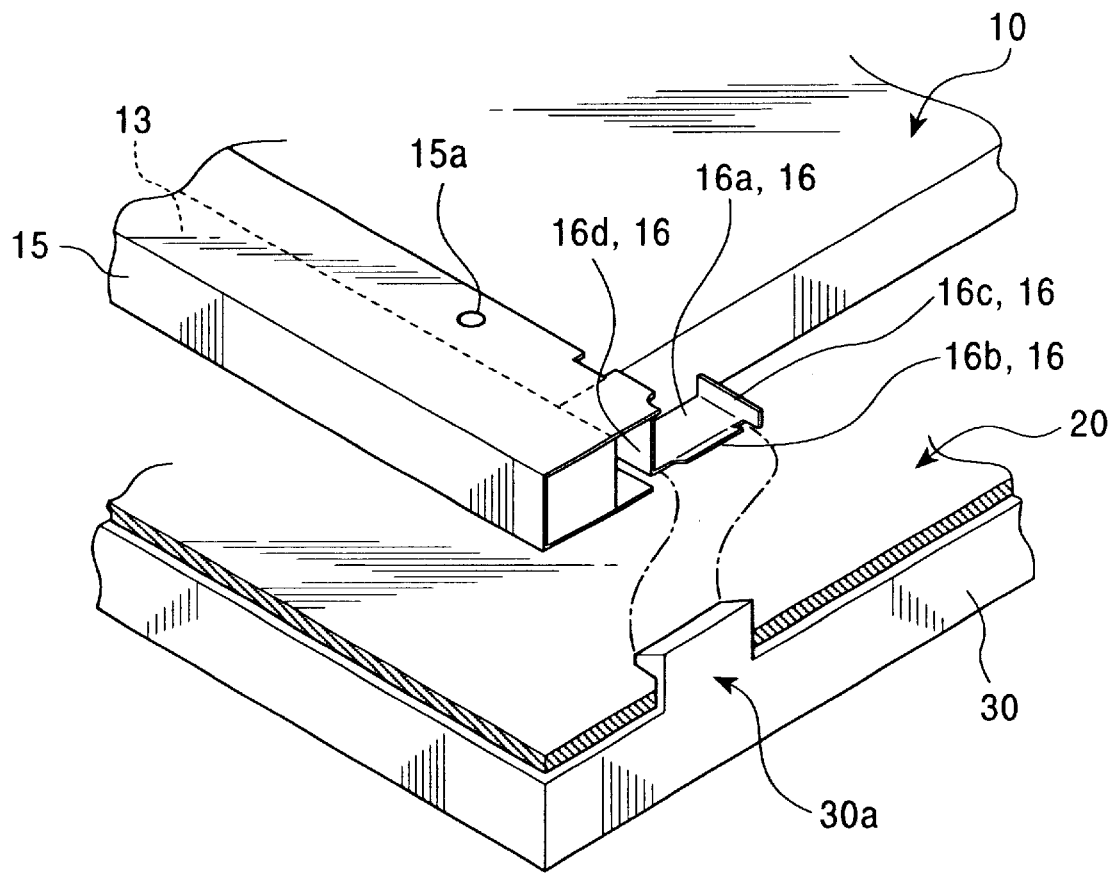
FIG. 5 is an enlarged perspective view of an engaging portion between a housing and a front light in the liquid crystal display device shown in FIG. 4.
Figure 6:
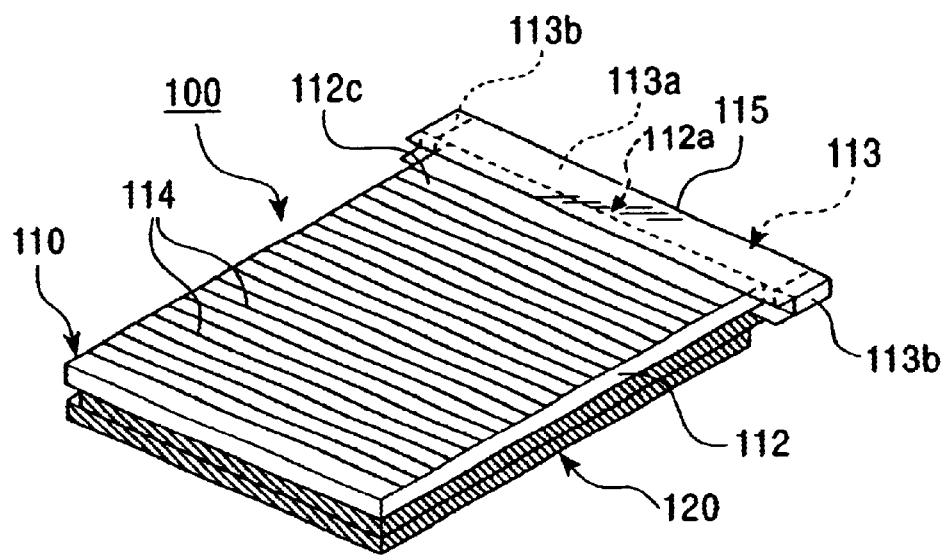
FIG. 6 is a perspective view of an example of a conventional front light.
Figure 7:
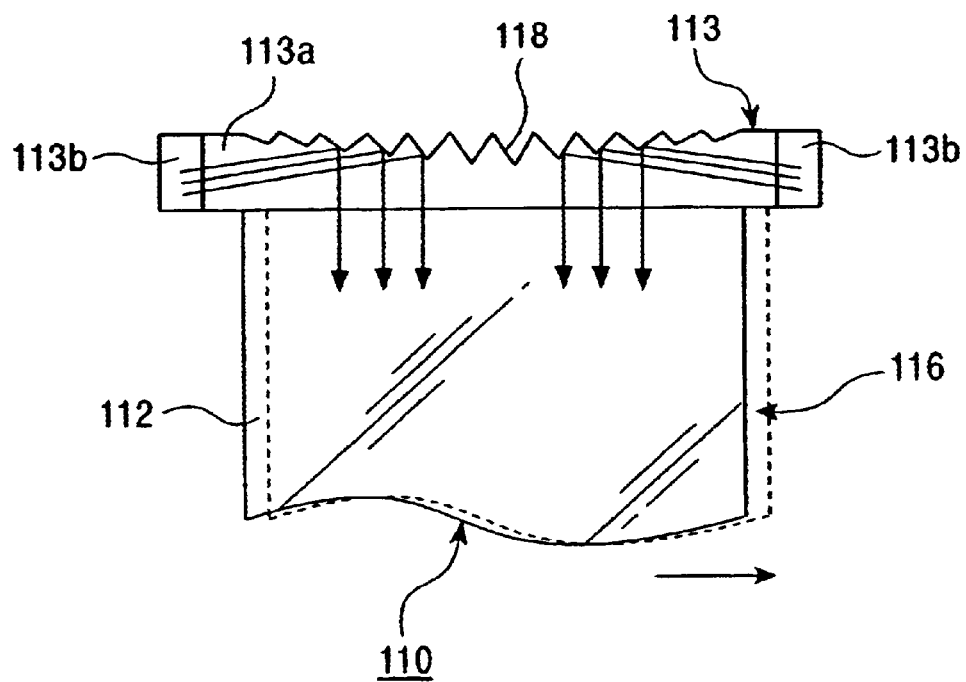
FIG. 7 is a partial plan view of the front light shown in FIG. 6.

FIG. 4 is a perspective view of a liquid crystal display device in which the above-described front light 10 of this embodiment is placed in the front of a liquid crystal display unit 20, and the front light 10 and the liquid crystal display unit 20 are supported by a housing 30. FIG. 5 is an enlarged perspective view of an engaging portion between the housing 30 and the front light 10 in the liquid crystal display device shown in FIG. 4. In the liquid crystal display device shown in these figures, the liquid crystal display unit 20 is stored inside the box-shaped housing 30, the front light 10 is placed on the front surface (upper surface) of the liquid crystal display unit 20, and the front light 10, the liquid crystal display unit 20, and the housing 30 are fixedly combined by engaging hook-shaped retaining members 30*a* formed in the housing 30 with the projecting pieces 16 of the cover member 15.

As shown in FIG. 5, the front light 10 is fixed by engaging the hook-shaped retaining members 30*a* formed in the housing 30 with the retaining portions 16*b* of the projecting pieces 16 in the liquid crystal display device of this example, and the width of the retaining members 30*a* is substantially equal to the length of the fitting plates 16*a* of the projecting pieces 16 (the length between the leading end of the base portion 16*d* and the base end of the retaining projection 16*c*). Consequently, the retaining members 30*a* engaged with the projecting pieces 16 are almost in contact with the base portions 16*d* and the retaining projections 16*c* formed in the side portions of the projecting pieces 16. Therefore, the movement of the front light 10 fixed to the housing 30 in the lengthwise direction of the light guide panel 12 is limited by the retaining members 30*a* sandwiched between the base portions 16*d* and the retaining projections 16*c*, and the front light 10 and the liquid crystal display unit 20 are inhibited from being displaced. This structure also makes it possible to precisely position and maintain the front light 10 relative to the housing 30. Moreover, it is only necessary to engage the retaining members 30*a* with the projecting pieces 16 in order to fix the front light 10 to the housing 30, and the liquid crystal display device can be constructed with great ease.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A surface-emitting device comprising:
   a bar-shaped light source; and
   a light guide panel in which light from said light source is introduced from an end face and is emitted from an emergent surface,
   wherein said light source is supported at an end of said light guide panel by a cover member disposed so as to cover said light source and said end of said light guide panel, projecting pieces are formed at both ends of said cover member so as to clamp said end of said light guide panel from both sides in a widthwise direction, and said light guide panel is positioned in the widthwise direction by said projecting pieces, and
   wherein the projecting pieces contain first portions that project in the widthwise direction of said light guide panel and second portions that extend from said first portions along a lengthwise direction of said light guide panel, and a distance between said projecting pieces is substantially equal to a width of said light guide panel.

2. The surface-emitting device according to claim 1, wherein a reflecting film for reflecting light from said light source is formed on an inner side of said cover member.

3. A liquid crystal display device comprising the surface-emitting device according to claim 1 that is disposed in a front of a liquid element.

4. The surface-emitting device according to claim 1, wherein protuberances are formed on an inner surface of said cover member so as to be in contact with said end of said light guide panel, and said cover member clamps said end of said light guide panel via said protuberances.

5. The surface-emitting device according to claim 1, wherein said first portions are base portions and the second portions are fitting plates, the second portions extend from leading ends of said base portions, retaining portions project from outer edges of the fitting plates and are bent upward at connecting portions to the fitting plates, and retaining projections are bent upward at leading ends of the fitting plates.

6. A liquid crystal display device comprising:

the surface-emitting device according to claim 5, a liquid crystal display element placed on an emergent side of said surface-emitting device; and a housing for supporting said surface-emitting device and said liquid crystal display element, wherein retaining members formed in said housing are engaged with said projecting pieces of said cover member in said surface-emitting device so that said surface-emitting device, said liquid crystal display element, and said housing are fixedly combined.

7. The liquid crystal display device according to claim 6, wherein a length of said fitting plates and a width of said retaining members are substantially equal to each other.

8. The liquid crystal display device according to claim 7, wherein the retaining members are almost in contact with the base portions and the retaining projections, thereby limiting movement of the light guide panel in the lengthwise direction.

9. The surface-emitting device according to claim 4, wherein said protuberances are arranged symmetrically with respect to a center of the light guide panel in the widthwise direction.

10. The surface-emitting device according to claim 1, wherein a distance between the projecting pieces and the light guide panel is at most 0.1 mm.

11. The surface emitting device according to claim 1, wherein the bar-shaped light source includes a bar-shaped light guide member and a light emitting element that are covered with the cover member.

12. A surface-emitting device comprising:

a bar-shaped light source; and a light guide panel in which light from said light source is introduced from an end face and is emitted from an emergent surface, wherein said light source is supported at an end of said light guide panel by a cover member disposed so as to cover said light source and said end of said light guide panel, projecting pieces are formed at both ends of said cover member so as to clamp said end of said light guide panel from both sides in a widthwise direction, and said light guide panel is positioned in the widthwise direction by said projecting pieces, and wherein said projecting pieces serve as fitting portions for fixing said surface-emitting device to a housing.

13. The surface-emitting device according to claim 12, wherein said projecting pieces respectively have base portions extending from both ends of said cover member in a thickness direction of said light guide panel, fitting plates extending from a-leading ends of said base portions in a lengthwise direction of said light guide panel, retaining portions projecting from outer edges of said fitting plates and bent upward at connecting portions to said fitting plates, and retaining projections bent upward at leading ends of said fitting plates.

14. A liquid crystal display device comprising:

the surface-emitting device according to claim 13, a liquid crystal display element placed on an emergent side of said surface-emitting device; and a housing for supporting said surface-emitting device and said liquid crystal display element, wherein hook-shaped retaining members formed in said housing are engaged with said projecting pieces of said cover member in said surface-emitting device so that said surface-emitting device, said liquid crystal display element, and said housing are fixedly combined.

15. The liquid crystal display device according to claim 14, wherein a length of said fitting plates and a width of said retaining members are substantially equal to each other.

16. The surface-emitting device according to claim 12, wherein a reflecting film for reflecting light from said light source is formed on an inner side of said cover member.

17. A liquid crystal display device comprising the surface-emitting device according to claim 12 and a liquid crystal display element, the surface-emitting device disposed in a front of the liquid crystal display element.

18. The surface-emitting device according to claim 12, wherein said light source is supported at an end of said light guide panel by a cover member disposed so as to cover said light source and said end of said light guide panel, protuberances are formed on an inner surface of said cover member so as to be in contact with said end of said light guide panel, and said cover member clamps said end of said light guide panel via said protuberances.

19. The surface-emitting device according to claim 18, wherein said protuberances are arranged symmetrically with respect to a center of the light guide panel in the widthwise direction.

20. The surface-emitting device according to claim 12, wherein a distance between the projecting pieces and the light guide panel is at most 0.1 mm.

21. The liquid crystal display device according to claim 15, wherein the retaining members are almost in contact with the base portions and the retaining projections, thereby limiting movement of the light guide panel in the lengthwise direction.

22. The surface emitting device according to claim 12, wherein the bar-shaped light source includes a bar-shaped light guide member and a light emitting element that are covered with the cover member.

* * * * *

UNITED STATES PATENT AND TRADEMARK OFFICE
CERTIFICATE OF CORRECTION

PATENT NO. : 6,692,134 B2
DATED : February 17, 2004
INVENTOR(S) : Kou Ohwada et al.

It is certified that error appears in the above-identified patent and that said Letters Patent is hereby corrected as shown below:

Column 8,
Line 59, after "liquid" insert -- crystal display --.

Column 10,
Line 1, delete "a-leading" and substitute -- leading -- in its place.

Signed and Sealed this

Twenty-ninth Day of June, 2004

JON W. DUDAS
*Acting Director of the United States Patent and Trademark Office*